United States Patent
Mintz

(10) Patent No.: US 10,263,888 B2
(45) Date of Patent: Apr. 16, 2019

(54) STICKY ORDER ROUTERS

(75) Inventor: Sagy Pundak Mintz, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 797 days.

(21) Appl. No.: 12/895,419

(22) Filed: Sep. 30, 2010

(65) Prior Publication Data

US 2012/0084191 A1    Apr. 5, 2012

(51) Int. Cl.
*G06Q 40/04* (2012.01)
*H04L 12/721* (2013.01)
*H04L 12/775* (2013.01)

(52) U.S. Cl.
CPC ............ *H04L 45/70* (2013.01); *G06Q 40/04* (2013.01); *H04L 45/58* (2013.01)

(58) Field of Classification Search
CPC ............................... G06Q 40/00; G06Q 40/04
USPC ...................... 705/35–45; 370/401
See application file for complete search history.

(56) References Cited

U.S. PATENT DOCUMENTS

| | | | |
|---|---|---|---|
| 6,772,132 B1 | 8/2004 | Kemp, II et al. | |
| 6,938,011 B1 | 8/2005 | Kemp, II et al. | |
| 7,127,424 B2 | 10/2006 | Kemp, II et al. | |
| 7,228,289 B2 | 6/2007 | Brumfield et al. | |
| 7,389,268 B1 | 6/2008 | Kemp, II et al. | |
| 7,685,044 B1 * | 3/2010 | Robertson | G06Q 40/00 705/35 |
| 7,756,782 B2 | 7/2010 | Monroe et al. | |
| 7,908,198 B1 * | 3/2011 | Keith | 705/37 |
| 8,045,566 B2 * | 10/2011 | Roeder | H04L 29/12009 370/230 |
| 2005/0025051 A1 | 2/2005 | Roeder | |
| 2005/0027635 A1 | 2/2005 | Monroe et al. | |
| 2007/0242619 A1 | 10/2007 | Murakami et al. | |
| 2010/0142369 A1 | 6/2010 | Gottwerth et al. | |
| 2010/0191638 A1 | 7/2010 | Alderucci et al. | |

(Continued)

FOREIGN PATENT DOCUMENTS

| | | |
|---|---|---|
| JP | 2004-504652 | 2/2004 |
| JP | 2004-312408 | 11/2004 |

(Continued)

OTHER PUBLICATIONS

English language translation of Japanese Office Action issued for JP App. No. 2013-531605, dated May 7, 2014.

(Continued)

*Primary Examiner* — Kito R Robinson
*Assistant Examiner* — Michael Cranford
(74) *Attorney, Agent, or Firm* — McDonnell Boehnen Hulbert & Berghoff LLP

(57) ABSTRACT

A sticky order routing system may include multiple order routers in communication with an electronic exchange for communicating transaction messages. Each of the order routers communicates transaction messages between multiple associated trading sessions and the electronic exchange, where of the associated trading sessions is assigned to the order router in communication with the electronic exchange. Transaction message traffic between the order routers and the electronic exchange is monitored, such as randomly, based on round-robin assignment, and/or trading data. In response to transaction message traffic exceeding a threshold, the trading session may be assigned to a new order router.

28 Claims, 4 Drawing Sheets

(56) References Cited

U.S. PATENT DOCUMENTS

2010/0293109 A1* 11/2010 Jain ...................... G06Q 40/04
705/36 R
2010/0299223 A1    11/2010 Crouch

FOREIGN PATENT DOCUMENTS

| | | |
|---|---|---|
| JP | 2004-320720 | 11/2004 |
| JP | 2005-39346 | 8/2006 |
| JP | 2006-229456 A | 8/2006 |
| JP | 2007-282142 | 10/2007 |
| JP | 2009-303090 | 12/2009 |
| JP | 2010-527064 | 8/2010 |
| JP | 2010-530591 A | 9/2010 |
| WO | 2008/140631 | 11/2008 |
| WO | 2008/157357 A1 | 12/2008 |

OTHER PUBLICATIONS

International Search Report and Written Opinion for PCT/US11/50111 dated Dec. 6, 2011.

* cited by examiner

| Order Router Configuration | ☒ |
|---|---|
| Configure Order Routing | Yes No |
| Reassign Order Router | ☒ ☐ |
| To next available | ☒ ☐ |
| To best available | ☒ ☐ |
| Time Sensitive | ☒ ☐ |

STICKY ORDER ROUTERS

TECHNICAL FIELD

The present invention relates generally to electronic trading, and particularly to managing and routing financial transactions.

BACKGROUND

An electronic trading system generally includes an electronic exchange in communication with one or more trading devices. The electronic exchange generally includes one or more centralized computers that receive, match, and process orders to buy or sell tradeable objects from traders, other electronic trading systems and/or other exchanges. Tradeable objects may include, for example, stocks, options, futures contracts, and commodities.

The electronic exchange transmits market data to the trading device. Market data includes, for example, data relating to a market for the tradeable object(s) to be traded, such as price data, market depth data, last traded quantity data, last traded price and data related to a market for the tradeable object.

The trading device provides a tool that allows the trader to participate in or view data relating to one or more markets. The trading device receives the market data from the electronic exchange. Some trading devices are configured to create interactive trading screens. In general, an interactive trading screen enables a user to submit a trade order to the electronic exchange, obtain a market quote, and monitor a position. The range and quality of features available on the interactive trading screen varies according to the specific software providing the interactive trading screen.

The trading device also or alternatively may not display the market data. For example, a trading device may be configured to provide an algorithmic trading platform and to derive aspects of a trade order (e.g., timing, price, and/or quantity of the order), and/or initiate and send a trade order without (or with very little) human intervention.

Upon receipt of a trade order or request for a transaction, the electronic exchange may enter the trade order into an exchange order book for matching against contra-side trade orders that also may be submitted to the electronic exchange for matching. By way of example, a sell order is contra-side to a buy order having the same price as the sell order. Similarly, a buy order is contra-side to a sell order with the same price. An unmatched quantity may be kept in the exchange order book until the quantity is matched, cancelled, deleted or otherwise removed. Upon matching, the electronic exchange may send confirmation to the trading device that trade order was matched.

A communication link may be provided between the trading device and the electronic exchange. The communication link may be a wired link, a wireless communication link, and combinations thereof. The communication link also may include one or more devices, such as networked computers, servers, gateways, order routers, and other related devices. The trading device and the electronic exchange may electronic communicate information according to a message format and messaging protocols, such as the TCP/IP protocol suite for the transport and network layers.

According to one type of trading communication, an order router may be assigned to administer communications between one or more trading devices and an electronic exchange. For example, a trader may sign onto or otherwise register with an electronic exchange via a trading device. An order router may be used for and/or to provide communications with the electronic exchange such as where a single order server may not connect directly to an electronic exchange (e.g., due to exchange rules or API limitations) or may connect with a limit to a number of transaction processing. During and/or after the registration, the order router may be assigned to administer communications between the trading device (or trading session) and the electronic exchange. Alternatively, the order router may be assigned to the trader prior to registration. The assignment between the order router and the trading device may be static or dynamic. That is, for a static assignment, the trading device, or order routing to the electronic exchange, is assigned to the specific order router. In a dynamic assignment, an order router is assigned for each order routed between the trading device and the electronic exchange. After the registration, transactions and other communications may be submitted between the trading device and the electronic exchange via the assigned order router.

A static assignment may have less overhead or require less processing cycles, and thus, a static assignment may provide faster order routing capabilities than a dynamic assignment, (i.e., the trading device is known). The order router may administer trade communications from multiple trading devices (and thus traders) to the electronic exchange. An amount of traffic handled by an order router may relate to the amount of volume or traffic from the trading devices to which it has been assigned. An order router that is assigned to trading devices that each has an increased volume may use increased processing overhead to handle the increased traffic. Limitations of the order router and/or the electronic exchange may introduce delays in the trade communications between an order router and the electronic exchange. Thus, a static assignment may increase a risk of an order being queued due to the order router being busy servicing another order or the order router may have reached or exceeded its throttling limit.

Thus, in general, it is desirable to improve one, some, or all of the components in the electronic trading system.

SUMMARY

Embodiments of sticky order routers may include methods, systems, apparatuses and the like.

An exemplary embodiment for order routing in an electronic trading environment with sticky order routers includes multiple order routers in communication with an electronic exchange, at least one transaction message traffic monitor and an order router balancer. The one transaction message traffic monitor and an order router balancer may be a single device or multiple components, such as an order Server or order management system. In an embodiment, trading sessions are generally assigned to one of the multiple order routers. The trading sessions may be assigned to an order router according to a round robin assignment algorithm, randomly, based on history for the trading session, based on historical data for a trader associated with a trading session, combinations thereof and the like.

The order routers are configured to communicate transaction messages with the electronic exchange. Each of the order routers communicates transaction messages for multiple assigned trading sessions for the order router. The transaction message traffic monitor monitors transaction message traffic between the order routers and the electronic exchange. In response to a determination that a trading session may be assigned to another order router, the order router balancer re-assign that trading session to the other second order router. The determination may be made, for example, according to a transaction message traffic comparison between the order routers, a time of day, history for the trading session or a trader associated with the trading session, combinations thereof and the like. In an example, when the transaction message traffic between the first order router and the electronic exchange exceeds transaction message traffic between the second router and the electronic exchange, the order router balancer may re-assign the trading session to the second order router.

Other embodiments of the present invention are described below. In addition, modifications may be made to the described embodiments without departing from the spirit or scope of the invention.

BRIEF DESCRIPTION OF THE FIGURES

Sticky order routers are described and illustrated via exemplary embodiments, which are not limited by the accompanying figures. Figures having like reference numerals indicate similar elements.

FIG. 4 illustrates an example of a configuration window for order routing.

DETAILED DESCRIPTION

I. Electronic Trading Environments

Figure 1:
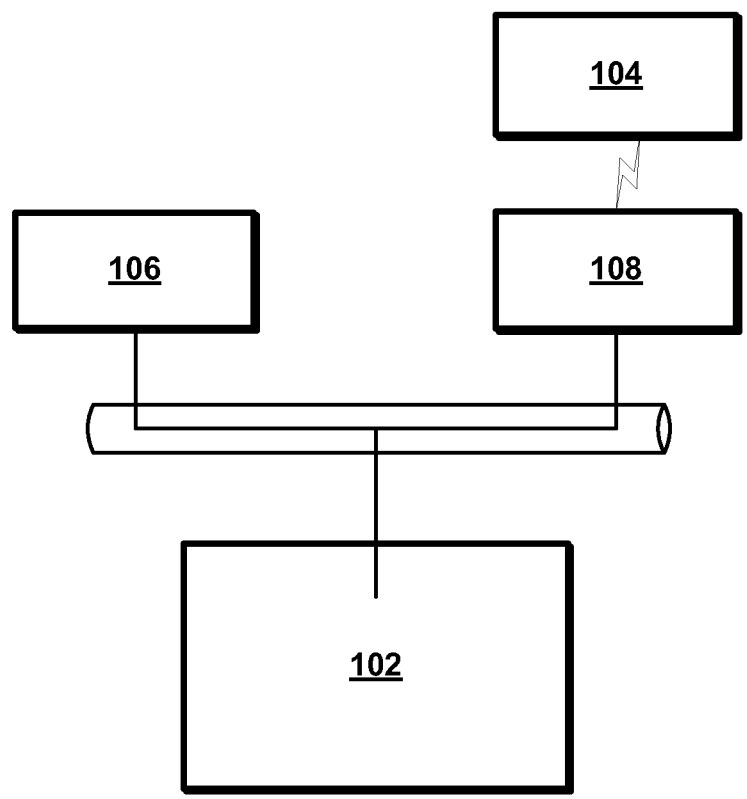
FIG. 1 illustrates an exemplary electronic trading environment for a sticky order router.

FIG. 1 illustrates an exemplary electronic trading environment for a sticky order router. The electronic trading environment includes a client device 102, a gateway 106, one or more electronic exchanges 104, and one or more routers 108. The client device 102 is operatively coupled with the electronic exchange 104 through one or more devices, such as gateway 106 and router 102 for communication of information. Router 108 is configured to route messages between the gateway 106, and thus the client device 102, and the electronic exchange 104.

The electronic exchange 104 may list one or more tradeable objects for trading. The electronic exchange 104 (e.g., CBOT, CME, Eurex, NASDAQ, NYSE etc.) includes at least one processor, or central computer for receiving and matching orders for a tradeable object. An order that may not be immediately matched may be stored and arranged in an order book. The order in the order book may be matched against a contra-side order according to a match algorithm. The electronic trading environment may include various electronic trading environments having the same, additional or alternative features.

The electronic exchange 104 also may distribute or broadcast information related to orders pending and/or matched at the electronic exchange 104 or other exchanges. The information may include data representing a current inside market (e.g., the lowest sell price (best ask) and the highest buy price (best bid)), and/or all or a portion of the market depth, including quantities of the tradeable object available at the inside market and/or quantities of the tradeable object available at prices away from or outside of the inside market, to the extent that such quantities are available. The information also may include news, charting data, the last traded price (LTP), last traded quantity (LTQ), and/or order-related information.

A quantity available at a price level may be provided in aggregate sums, such as a total buy or sell quantity available at a price level. The extent that the market depth is provided generally depends on the exchange and/or other parameters, such as volume. Information related to order fills (also referred to as order execution, filled orders, and order completion) may be referred to as market data.

The client device 102 may be one or more devices, such as multiple work stations or a network of devices, and may execute one or more applications. Examples include one or more mainframe, desktop, notebook, tablet PC, handheld, personal digital assistant, Smartphone, server, gateway, combination thereof, or other computing device having one or more processors or central processing units. For example, the client device may be include any combination of one or more single or multi-core processors, an operating system, one or more memory or data storage devices, a data input interface for receiving data from a communications network, a user input interface for receiving input signals from one or more input devices (e.g., a keyboard, a trackball, pen device, microphone, gazing detection device, mouse for click-based trading), and/or an output interface suitable for presenting information (e.g., a monitor or display device, audio device, or combination thereof).

The client device 102 may display market information received from one or more exchanges or other sources. For example, the display device is a video display, such as an LCD-based or a gas plasma-based flat-panel display, a display that shows three-dimensional images, audio devices, and/or Braille output devices or some other type of output device or mechanism. The display device may include an input device to provide for interaction between the user and the information.

The client device 102 may be configured to submit one or more orders for one or more tradeable objects for trading. An order may include instructions or transaction messages related to an order. Transaction messages may refer to any type of message sent to an electronic exchange to place or submit a new order, cancel an existing order, change an existing order or quote, initiate query about orders or order book for one or more tradeable objects, test a connection to, or communication with, an exchange, acknowledgements, fills, cancels, deletes, cancel and replace, other well-known financial transaction messages, combinations thereof and the like.

A trader, or other user of the client device 102, may send an order, such as by supplying one or more commands using one or more input devices associated with the client device, including a keyboard, a mouse or pointing device, a portion of the display, touching or controlling an area of the display or area controlled by the display. The client device 102 may generate transaction information in response to the user input. The transaction information may be sent to one or more exchanges.

Instructions or code for carrying out acts for sticky order routers may be stored or otherwise recorded on a computer readable medium, such as non-volatile media, volatile media and transmission media, including floppy disks, flexible disks, hard disks, magnetic tape, punch cards, CD-ROM, a RAM, a PROM, an EPROM, a FLASH-EPROM, and any other memory chip or cartridge, or medium from which a computer can read. The processor may have sufficient processing capability for available market information and for carrying out the acts.

Software and/or hardware may administer trading tools having interactive trading screens on display devices for viewing the market information, entering and submitting orders, obtaining market quotes, and monitor positions. Additionally or alternatively, the client device may automate trading. An example of such trading tool includes X_TRADER® by Trading Technologies International, Inc. of Chicago, Ill., and may also include an electronic trading interface, referred to as MD Trader®. Portions of the X_TRADER and the MD Trader style display are described in U.S. Pat. No. 6,772,132 for a "Click Based Trading With Intuitive Grid Display of Market Depth," U.S. Pat. No. 6,938,011 for a "Click Based Trading with Market Depth Display" U.S. Pat. No. 7,127,424 for a "Click Based Trading With Intuitive Grid Display of Market Depth and Price Consolidation," U.S. Pat. No. 7,389,268 for "Trading Tools For Electronic Trading," and U.S. Pat. No. 7,228,289 for "A System and Method for Trading and Displaying Market Information in an Electronic Trading Environment," the contents of each are incorporated fully herein by reference. Other trading tools may also or alternatively be used.

Access to the electronic exchanges from the client device 102 may be provided through one or more gateways 106, and/or a combined gateway that provides access to multiple electronic exchanges. The gateway 106 may reside on the client device, or it may be located on a separate physical device on a computer network. Alternatively or in addition, a single physical device may provide more than one a gateway 106. In addition or alternatively, router 108 may route data between gateways and electronic exchanges.

The gateway 106 may be a computing device having one or more single or multi-core processors or central processing units, memory or data storage devices, communication interfaces, user input interfaces, and output interfaces. The gateway 106 may include or access a database. The gateway 106 may execute one or more gateway applications, may execute application programs of the client device 102, and/or the gateway applications may be performed by the client device 102.

The gateway 106 may track or otherwise monitor message flow and system usage parameters for the amount of transaction messages to an exchange. For example, the gateway 106 may measure an amount of traffic, or number or rate of transaction messages, through router 108 to ensure that the traffic does not exceed predetermined message thresholds. The system preferably acts to monitor and/or adjust order router assignments. Adjusting order router assignment may be adjusted according to according to limits of the order router and/or the electronic exchange. In an embodiment, a trading session may be assigned to an order router. The trading session may be assigned randomly, according to a round-robin decision-making process, and/or according to a trader's preferences and/or historical trading volume. For example, a trader may be assigned to a predetermined order router.

II. Order Routing to Electronic Exchanges

Figure 2:
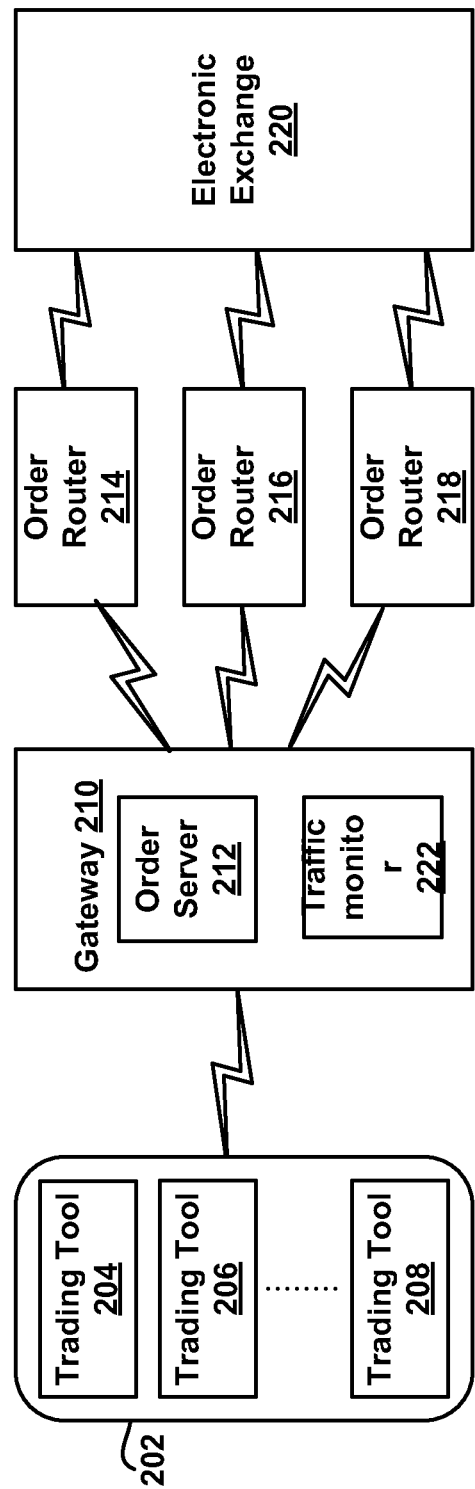
FIG. 2 illustrates an exemplary for sticky order routers in an electronic trading environment.

According to an embodiment, an assignment for an order router may be changed or later adjusted according to volume of transactions handled by the order router, volume of transactions handled by another order router, a predictive model, trader history, threshold limits or other one or more other factors for determining whether to assign a trading session to another order router FIG. 2 shows an exemplary system for stick order routers. The system includes one or more client devices 202, in communication with and electronic exchange 220 through one or more gateways 210 and at least one order router 214-218. The client device 202 may be configured to administer or provide for an interface for electronic trading using one or more trading tools 204-208. The trading tools 204-208 may be configured to provide an interface for a market for one or more tradeable objects. In addition, the trading tools 204-208 also may be configured to receive, filter, and/or process data from one or more electronic exchanges 220. The client device 202 may be a single device, multiple devices such as networked computers, processors, servers and the like. The client device may be associated with a single trader, or may be a trading house (or trading desk) for multiple traders.

Gateway 210 may be implemented on any one of the gateways 106 illustrated in FIG. 1. The gateway 210 generally communicates information between the client device 202 and the electronic trading exchange 220 (e.g., CBOT, CME, Eurex, etc.). Gateway 210 may be connected to, coupled with or otherwise in communication with client devices 202 and the electronic exchange 220 through a wired connection, a wireless connection, and/or a combination of a wired and wireless connection, such as LAN, WAN, or other connection medium. The gateway 210 also may have an administrator interface 102 for monitoring the communications, distributing alerts concerning the use and status of network and exchange resources, and controlling communications.

The gateway 210 may reside on the same physical computing platform as a client device 202, may be located on a separate physical device on a computer network, and/or may be co-located with the electronic exchange 220. The gateway 210 also or alternatively may also be distributed, such as distributed across multiple devices in a computer network.

A physical embodiment of the gateway 210 may also implement further features. In an example, a physical embodiment of the gateways 210, such as a computing device may be one or more servers and implement functions such as a router, firewall, or other common network infrastructure component. The gateway 210 also or alternatively may implement a price server, and/or a fill server. A price server and/or order server may perform translation features to translate between a format or communication protocol provided by the electronic exchange to an internal format, and maintain state or provide a record for which orders are working at the electronic exchange, which order are in-flight, which orders are on hold. The order server may also perform validity checking on new orders or changes to working orders. In addition, a single physical device may provide more than one instantiation of a gateway 210 or the gateway may be implemented across multiple devices. An API (applications programming interface—not shown) also may be provided between the trading workstation 202 and gateway 210.

As shown in FIG. 2, gateway 210 may include an order server 212. The order server 212 is configured to receive orders from the client device, process the order and/or format an order message to be sent to the electronic exchange.

The electronic exchange may be any electronic exchange, electronic communication network, automated trading system and the like. In an embodiment, the electronic exchange is implemented as described for electronic exchange 104 of FIG. 1.

The order routers 214-218 handle communications between the gateway 210 and the electronic exchange. The communications generally include information related to trade orders for tradeable object listed, matched and/or otherwise traded via the electronic exchange 220. Although FIG. 2 includes 3 order routers 214-218, more or fewer order routers may be provided.

In an example, gateway 210 is connected to multiple client devices 202 and multiple order routers 214-218. Each of the client devices may be associated with one or more trading session. For example, a trading session may occur when a trader signs on, registers, joins, logs in, joins or otherwise registers with the gateway 210 and thus the electronic exchange 220 for receiving data for a tradeable object from the electronic exchange and submitting orders to buy or sell tradeable objects to the electronic exchange. The trading session may be ended by the trader, such as by signing off, by the exchange, and/or by an administrator.

The trading session may be assigned to an order router 214-218. For example, trading session N may be assigned to order router 216. Once assigned to order router 216, communications for orders between the client device 202 associated with trading session N and the electronic exchange 220 are routed to the electronic exchange 220 via the order router 216. To identify order router 216 assigned for the trading session, order messages communicated between the client device 202 and the electronic exchange may include an identifier in the order message indicating that order router 216 has been assigned for handling or otherwise processing the order message.

Trading sessions may be assigned to one of the order routers 214-218 randomly and/or through a round robin determination where order routers may be assigned according to a sequence, series, succession and/or order according to when a trading session is initiated. For example, order routers 214-218 may be assigned without order or prior determination and/or order router 214 may be assigned to a first-initiated trading session, order router 216 is assigned to a second-initiated trading session, order router 218 is assigned a third-initiated trading session and then back to order router 214 for the next trading session.

In an alternative or additional embodiment, trading session may be assigned to a specific order router. For example, a trading session N may be primarily assigned to order router 214. Thus, when the trader associated with trading session N signs on to trade, the trading session is assigned to order router 214. The trading session N also may be assigned without regard to other order router assignment protocols.

In an alternative embodiment, a trading session may be assigned to an order router 214-218 based on historical data for a trader associated with the trading session. For example, the historical trading data may relate to past trades, number of trade orders, or trade order messages submitted by the trader. In an instance where the historical data shows that the trader is a high volume trader, or is otherwise a heavy user of order message traffic between the client device 202 and electronic exchange 220, the trading session of the trader may be assigned to one of the order routers 214-218 having less order message traffic than other order routers 214-218. In an instance where the historical data show that the trader does not utilize as much trade message traffic, the trading session for the trader may be assigned to an order router capable of handling the order message traffic.

In an embodiment, the historical data may be compared to a threshold where the trading session may be assigned to one of the order routers 214-218 based on the comparison. The trading session also may be assigned to one of the order routers based on the comparison an amount of traffic being handled by the order router to which the trading session is being assigned and/or some or all other order routers.

In an embodiment, a transaction message traffic monitor 222 may monitor the traffic between an order router 214-218 and electronic exchange 220. The transaction monitor 222 may be implemented with the gateway 210 and/or with one or each of the order routers 214-218. The transaction message traffic monitor 22 may measure an amount of traffic flowing through the order router 214-218.

In an embodiment, the amount of traffic through an order router 214-218 may be compared to a threshold. The threshold may be predetermined, and may be provided by a user, the trader, an administrator or other party. When the amount of traffic through an order router exceeds a threshold, one or more of the trading sessions assigned to the order router 214-218 may be assigned to another order router 214-218. The trading session to be assigned may be selected based on the amount of traffic generated or used by the trading session, based on user preferences or determinations, randomly determined and/or other methods for identifying a trading session to be reassigned. For example, when the amount of traffic through order router 214 is determined to exceed a threshold, a trading session N assigned to order router 214 is determined to use the highest level of order message traffic of trading sessions assigned to the order router and is assigned to a new order router 216. Subsequently, communications for trade orders associated with the trading session N will flow through new order router 216. The new order router 216 may be assigned randomly, through a round-robin determination, based on time, and/or based on a determination that order router 216 will have the new assignment for trading session N without exceeding threshold.

The threshold may be any number for identifying a maximum number of order message traffic, allowable amount of traffic, allowable amount of average traffic or bandwidth for a trading session combinations thereof and the like. The threshold may be a number of order messages per second, may include a sliding window for messages transmitted, a total number of order messages for the day, a number of in-flight order messages (i.e., submitted to an exchange but not yet acknowledged), a number of data bytes per time or the total number of bytes for the day. A threshold may be selected so that limited resources may be evenly controlled fashion. The threshold may be different or substantially the same for each user or group of users. A threshold may be set manually by an administrator, or may be automatically set and/or adjusted. Automatic adjustment may be based on the number of fills, a profit or other measure of success, a measure of bandwidth utilization combinations thereof or the like.

In an alternative or additional embodiment, the amount of traffic through each order router may be monitored and/or compared to identify an order to which a trading session may be re-assigned. In an example, the order message traffic through each order router is monitored and compared against each other. Based on the comparison, trading session N assigned to order router 214 may be re-assigned to order router 216. The comparison may identify that the order message traffic through order router 214 with trading session N assigned to order router 214 is greater than order message traffic through order router 216 with trading session N assigned to order router 216. Subsequently, trading session N is reassigned to order router 216.

Additionally or alternatively, the comparison may identify a difference in the order message traffic is greater than a threshold. In an example when the order message traffic is monitored for multiple order routers 214-218, a difference between order message traffic between two order routers 214 and 216 may be determined. According to the comparison, a trading session N assigned to order router 214 may be identified and reassigned or switched to order router 216. Trading session N may be identified by the amount of order message traffic associated with trading session N, an average amount of order message traffic associated with trading session N, preferences or settings, a comparison of order message traffic associated with trading session N with other order message traffic associated with order router 214, a comparison of order message traffic associated with trading session N with order message traffic associated with order router 216, historical data, determinative data, combinations thereof and the like.

Additionally or alternatively, a trading session reassignment or switch to another order router may be time-based. In an exemplary embodiment, one or more trading sessions assigned to an order router may be reassigned or switched to a new order router at a predetermined time, such as a predetermined time of day. For example, when a trading day for an electronic exchange ends, or the electronic exchange closes, trading sessions may be consolidated, where trading sessions are reassigned to a lower number of order routers. Conversely, prior to or when a trading day for an electronic exchange opening or beginning, trading sessions for one or more order router may be reassigned to so that a larger number of order routers handle the trading sessions.

In an addition or alternative embodiment, predictive modeling may be employed to determine when to reassign or switch a trading session from one order router to another order router. Predictive modeling may be employed using historical trading data for a trader associated with a trading session and/or market data for one or more tradeable objects. According to the predictive modeling, the trading session may be assigned to a new order router. For example, the predictive modeling may identify a tradeable object that the trader may trade during a period of time, when volume reaches a certain level, when prices for the tradeable object reach a certain level or change a certain amount and the predictive modeling may identify that the amount of order message traffic for the trader may change. Thus, the trading session may be reassigned or switched to a new order router. Thus, should the order message traffic associated with the trading session increase, a new order router will provide a better opportunity for handling the increased order message traffic.

In an embodiment, a notification may be provided identifying a reassignment of an order router. An administrator may receive the notification by email or other suitable messaging system, including instant messaging, and/or on-screen message, such with the interface.

Figure 3:
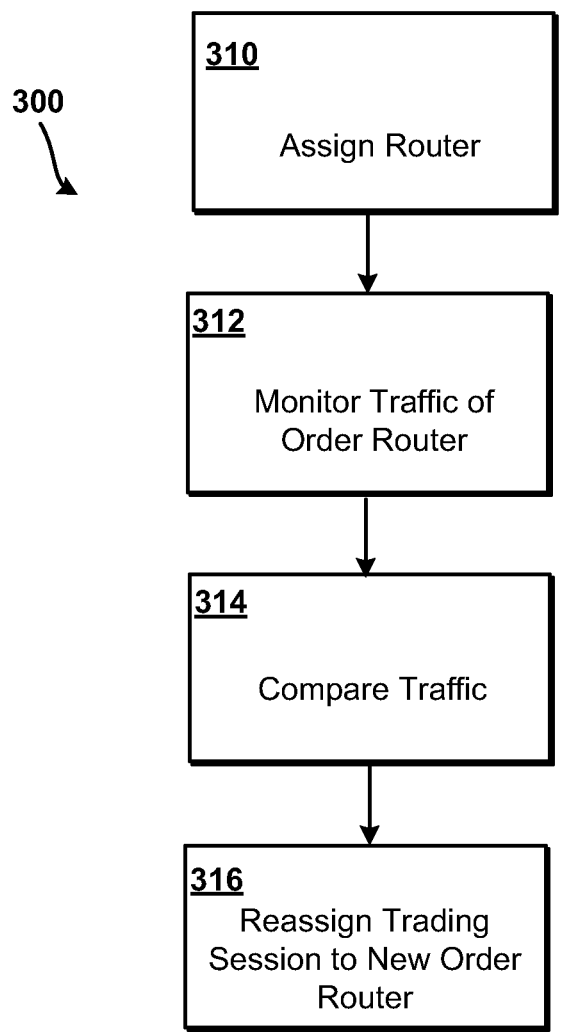
FIG. 3 illustrates a flow chart for an exemplary method for routing trade messages in an electronic exchange.

FIG. 3 illustrates a flow chart for an exemplary method for routing trade messages in an electronic exchange. In the exemplary method, a trading session is assigned to a trading session 310. The trading session may be assigned according to a round-robin protocol, randomly, pre-assigned, combinations thereof and the like as described. Order message traffic for one or more order routers may be monitored or otherwise reviewed 312 to determine the amount of order message traffic associated with the one or more order routers.

The amount of order message traffic may be compared 314 as described. The amount of order message traffic may be compared to a threshold, to order message traffic through other order routers, to predetermined setting or preferences (e.g., administrator or trader settings), time, combinations thereof or the like. The threshold(s) may be static or dynamic. The threshold may be any number and may represent a number or orders currently processed, previously processed, or estimated to be processed.

In response to the comparison, one or more trading sessions may be identified for reassignment or being switched to a new order router 316. The trading session to be switched or reassigned may be identified according to any of a variety of now known or later developed factors for identifying a trading session. Subsequently, order message traffic for the switched or reassigned trading session may be through the new order router.

III. Sticky Order Router Configuration

FIG. 4 illustrates an example of a configuration window 400 for providing preferences or settings for a sticky order router. The configuration window 300 may be used by an administrator, operator, and/or a trader to provide inputs that may be used for determining whether a trading session may participate in an order router reassignment. A setting may be selected, such as from a pull-down menu and the like, and a window with options or selection provided for identifying parameters for reassignment of a trading session, such as with the configuration window 400. The configuration window 400 may include a primary selector to identify whether a trading session and corresponding order router assignment may be eligible for reassignment. The configuration window may allow for the selection or other identification for configuring order routing. For example, a user or trader may select to have all, a portion of, or selected or identified orders or order types eligible for reassignment of an assigned order router. The user may also identify or enter conditions for when reassignment of an order router may occur. The user also may identify to which order router an current assignment may be reassigned and whether reassignment may be time sensitive or dependent on time of day, or other condition.

Selections of the options may be made through now known and/or later developed methods for selecting options and/or setting parameters, such as drop-down menus, radio buttons, text entry and the like. The options may be made for an entire trading session, and other characteristic, such as a tradeable object, market activity, trader activity, time combinations thereof and the like. The selection may be made prior to a trading session and/or during a trading session. Once selected, the settings may be used for reassigning all or part of a trading session to a new order router.

In the above description those skilled in the art will recognize that circuit elements in block diagrams and boundaries between logic blocks are merely illustrative and that alternative embodiments may merge logic blocks or functional elements or impose an alternate decomposition of functionality upon various logic blocks or elements. For example, the gateway features may be performed by a client device. Numerous other examples will be apparent to those of skill in the art.

It will be apparent to those of ordinary skill in the art that methods involved in the system and methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

While the invention has been described in connection with a number of exemplary embodiments, the foregoing is not intended to limit the scope of the invention to a particular form, circuit arrangement, or semiconductor topology. To the contrary, the invention is intended to be defined only by the appended claims and to include such alternatives, modifications and variations as may be apparent to those skilled in the art upon reading the foregoing detailed description.

The claims should not be read as limited to the described order or elements unless stated to that effect. Therefore, all embodiments that come within the scope and spirit of the following claims and equivalents thereto are claimed as the invention.

The invention claimed is:

1. A method for managing trading communications with an electronic exchange, the method comprising:
    establishing, via a processor of a client device, a communication link between a client device and an electronic exchange, the communication link for electronically communicating, via a first order router, multiple messages from the client device to the electronic exchange and from the electronic exchange to the client device for transacting multiple orders for at least one tradeable object at the electronic exchange;
    assigning, via the processor of the client device, a communication session for the client device and the first order router according to historical data of trading volume for a trader associated with the client device, where the communication session includes the multiple messages from the client device to the electronic exchange and from the electronic exchange to the client device via the first order router;
    comparing, via the processor of the client device, communications traffic between the first order router and the electronic exchange for the communication session to a predetermined communications threshold;
    determining, via the processor of the client device, whether the communications traffic exceeds the predetermined communications threshold; and
    in response to determining that the communications traffic exceeds the predetermined communications threshold, re-assigning, via the processor of the client device, the communication session to a second order router in communication with the electronic exchange, where, subsequent to the assigned communication session being reassigned to the second order router, multiple subsequent electronic trading communications from the client device to the electronic exchange and from the electronic exchange to the client device are via the second order router.

2. The method of claim 1 where the historical data comprises trading data for the trader associated with the communication session prior to the communication session being assigned to the first order router.

3. The method of claim 1 where re-assigning the communication session further comprises:
    comparing, via the processor of the client device, communications traffic between the second order router and the electronic exchange with the communications traffic between the first order router and the electronic exchange; and
    in response to determining that the communications traffic between the first order router and the electronic exchange exceeds the communications traffic between the second order router and the electronic exchange, assigning, via the processor of the computing device, the communication session to the second order router in communication with the electronic exchange.

4. A non-transitory computer readable medium having instructions stored thereon, which when executed by a processor cause the processor to carry out acts comprising:
    establishing, via a processor of a client device, a communication link between a client device and an electronic exchange, the communication link for electronically communicating, via a first order router, multiple messages from the client device to the electronic exchange and from the electronic exchange to the client device for transacting multiple orders for at least one tradeable object at the electronic exchange;
    assigning, via the processor, a communication session for the client device and the first order router according to historical data of trading volume for a trader associated with the communication session, where the communication session includes the multiple messages from the client device to the electronic exchange and from the electronic exchange to the client device;
    comparing, via the processor, communications traffic between the first order router and the electronic exchange for the communication session to a predetermined communications threshold;
    determining, via the processor, whether the communications traffic exceeds the predetermined communications threshold; and
    in response to determining that the communications traffic exceeds the predetermined communications threshold, re-assigning, via the processor, the communication session to a second order router in communication with the electronic exchange, where, subsequent to the communication session being reassigned to the second order router, multiple subsequent communications from the client device to the electronic exchange and from the electronic exchange to client device are via the second order router.

5. The non-transitory computer readable medium of claim 4 where the historical data comprises trading data for the trader associated with the communication session prior to the communication session being assigned to the first order router.

6. The non-transitory computer readable medium of claim 4 where re-assigning the communication session further comprises:
    comparing, via the processor, communications traffic between the second order router and the electronic exchange with the communications traffic between the first order router and the electronic exchange; and
    in response to determining that the communications traffic between the first order router and the electronic exchange exceeds the communications traffic between the second order router and the electronic exchange, assigning, via the processor, the communication session to the second order router in communication with the electronic exchange.

7. An order routing system comprising:
    a plurality of order routers in communication with an electronic exchange for electronically communicating transaction messages, where each order router of the plurality of order routers communicates multiple transaction messages for a plurality of associated assigned communication sessions with the electronic exchange, where each communication session includes electronic multiple trading communications with the electronic exchange for transacting multiple orders for at least one tradeable object at the electronic exchange and where, for an assigned communication session for a client device, multiple electronic communications from the client device to the electronic exchange and from the electronic exchange to the client device for transacting multiple orders for at least one tradeable object at the electronic exchange are via a first order router of the plurality of order routers;

a transaction message traffic monitor configured to monitor communications traffic between each order router of the plurality of order routers and the electronic exchange for the plurality of associated assigned communication sessions; and an order router balancer configured to re-assign the assigned communication session for the client device to a second order router of the plurality of order routers according to communications traffic between the first order router and the electronic exchange exceeding a first predetermined communications threshold and according to historical data of trading volume for a trader associated with the assigned communication session, where, subsequent to the assigned communication session being reassigned to the second order router, multiple subsequent communications from the client device to the electronic exchange and from the electronic exchange to the client device for transacting orders for the at least one tradeable object at the electronic exchange are via the second order router.

8. The order routing system of claim 7 where communications traffic between the first order router and the electronic exchange exceeds communications traffic between the second router and the electronic exchange prior to re-assigning the assigned communication session.

9. The order routing system of claim 7 where the order router balance is further configured to re-assign a communication session associated with a third order router to a fourth order router according to transaction message traffic between the fourth order router and the electronic exchange being less than a second predetermined communications threshold.

10. The order routing system of claim 9 where transaction message traffic between the fourth order router and the electronic exchange is less than the first predetermined communications threshold after re-assigning the communication session associated with a third order router.

11. The order routing system of claim 7 where each of the plurality of associated assigned communication sessions is assigned to an associated order router according to a round robin algorithm.

12. The order routing system of claim 7 where each of the plurality of associated assigned communication sessions is randomly assigned to an associated order router among the plurality of order routers.

13. The order routing system of claim 7 where each of the plurality of associated assigned communication sessions is assigned according to historical data for the communication session.

14. The order routing system of claim 7 where each communication session of the plurality of associated assigned communication sessions is associated with a client device.

15. A method for managing trading communications, the method comprising:

assigning, via a processor of a client device, a first trading session for the client device to a first order router of a plurality of order routers in communication with an electronic exchange, where the first trading session includes electronic trading communications between the client device and the electronic exchange for transacting orders for at least one tradeable object via the first order router;

comparing, via the processor of the client device, communications traffic between the first order router and the electronic exchange for the trading session to a predetermined communications threshold; and in response to determining that the communications traffic exceeds the predetermined communications threshold:
assigning, via the processor of the client device, a second trading session for the client device to a second order router of the plurality of order routers in communication with the electronic exchange, and cancelling the first trading session, where, subsequent to assigning the second trading session and cancelling the first trading session, electronic trading communications between the client device and the electronic exchange are via the second order router.

16. The method of claim 15 where assigning the first trading session comprises at least any one of randomly assigning the first trading session and assigning the first trading session in a round-robin.

17. The method of claim 15 where assigning the first trading session comprises assigning the first trading session according to historical data of trading volume for a trader associated with the trading session.

18. The method of claim 17 where the historical data comprises trading data for the trader associated with the trading session prior assigning the first trading session to the first order router.

19. The method of claim 15 where the second trading session is assigned to the second order router in response to determining that communications traffic between the first order router and the electronic exchange exceeds communications traffic between the second order router and the electronic exchange.

20. A non-transitory computer readable medium having instructions stored thereon, which when executed by a processor cause the processor to carry out acts comprising:

assigning, via a processor of a client device, a first trading session for client device to a first order router of a plurality of order routers in communication with an electronic exchange, where the first trading session includes electronic trading communications between the client device and the electronic exchange for transacting orders for at least one tradeable object via the first order router;

comparing, via the processor of the client device, communications traffic between the first order router and the electronic exchange for the trading session to a predetermined communications threshold; and in response to determining that the communications traffic exceeds the predetermined communications threshold:
assigning, via the processor of the client device, a second trading session for the client device to a second order router of the plurality of order routers in communication with the electronic exchange, and cancelling the first trading session, where, subsequent to assigning the second trading session and cancelling the first trading session, electronic trading communications between the client device and the electronic exchange are via the second order router.

21. The non-transitory computer readable medium of claim 20 where assigning the first trading session comprises at least any one of randomly assigning the first trading session and assigning the first trading session in a round-robin.

22. The non-transitory computer readable medium of claim 20 where assigning the first trading session comprises assigning the first trading session according to historical data of trading volume for a trader associated with the trading session.

23. The non-transitory computer readable medium of claim 22 where the historical data comprises trading data for the trader associated with the first trading session prior to assigning the first trading session to the first order router.

24. The non-transitory computer readable medium of claim 20 where the second trading session is assigned to the second order router in response to determining that communications traffic between the first order router and the electronic exchange exceeds communications traffic between the second order router and the electronic exchange.

25. An order routing system comprising:
a plurality of order routers in communication with an electronic exchange for electronically communicating transaction messages, where each order router of the plurality of order routers communicates transaction messages between a plurality of client devices and at least one electronic exchange, where for a client device, a first trading session for the client device is assigned to a first order router of the plurality of order routers, and where the first trading session includes electronic trading communications between the client device and the electronic exchange for transacting orders for at least one tradeable object via the first order router;
a transaction message traffic monitor configured to monitor communications traffic between each order router of the plurality of order routers and the at least one electronic exchange; and
an order router balancer configured to assigned a second trading session for the client device to a second order router of the plurality of order routers according to communications traffic between the first order router and the electronic exchange exceeding a first predetermined communications threshold and to cancel the first trading session, where, subsequent to the assigning the second trading session to the second order router, subsequent electronic trading communications between the client device and the electronic exchange are via the second order router, where communications traffic between the first order router and the electronic exchange exceeds communications traffic between the second router and the electronic exchange prior to assigning the second trading session.

26. The order routing system of claim 25 where each trading session of a plurality of trading sessions is assigned to an associated order router according to a round robin.

27. The order routing system of claim 25 where each trading session of a plurality of trading sessions is randomly assigned to an associated order router.

28. The order routing system of claim 25 where each trading session of a plurality of trading sessions is assigned according to historical data.

* * * * *